United States Patent [19]

Kaneshima

[11] Patent Number: 5,224,097
[45] Date of Patent: Jun. 29, 1993

[54] DATA COMMUNICATION SYSTEM

[75] Inventor: Toshihito Kaneshima, Kawasaki, Japan

[73] Assignee: Fujitsu Limited, Kawasaki, Japan

[21] Appl. No.: 705,680

[22] Filed: May 24, 1991

[30] Foreign Application Priority Data

May 28, 1990 [JP] Japan .................. 2-135428

[51] Int. Cl.$^5$ .......................................... H04L 12/00
[52] U.S. Cl. .................. 370/85.8; 340/825.08
[58] Field of Search ............ 370/85.7, 85.8, 95.1, 370/95.2, 97; 340/825.08; 375/8

[56] References Cited

U.S. PATENT DOCUMENTS 4,100,533 7/1978 Napolitano et al. .......... 370/85.8 R
4,727,541 2/1988 Mori et al. .................. 370/112

FOREIGN PATENT DOCUMENTS 0149253 7/1985 European Pat. Off.
0229316 7/1987 European Pat. Off.
0001953 1/1985 Japan .................. 370/85.8

Primary Examiner—Douglas W. Olms
Assistant Examiner—Melvin Marcelo
Attorney, Agent, or Firm—Nikaido, Marmelstein, Murray & Oram

[57] ABSTRACT

A data communication system which can eliminate the need for repeating equipment therein system, and allowing coexistence of an analog line and a digital line. The system also prevents generating any delays in the transfer of information. The system utilizes slave stations provided between the analog line and digital line of the data communication system, which have a modem circuit connected to the analog line for demodulating the signal sent from the master station and modulating the signal to the lower level slave station and the signal to the master station from that particular station. A control means connected to the modem circuit is provided for extracting a slave station discrimination number or transmission address from the polling signal sent from the master station received through the modem circuit, determining whether the extracted discrimination number is the discrimination number of a lower level slave station outputting a carrier control signal for sending the carrier signal to the line in order to send an analog signal to the line for the modem circuit in accordance with the result of the determination.

6 Claims, 7 Drawing Sheets

Fig. 5

| START CODE | NUMBER OF SLAVE STATION | COMAND | STOP CODE |
|---|---|---|---|

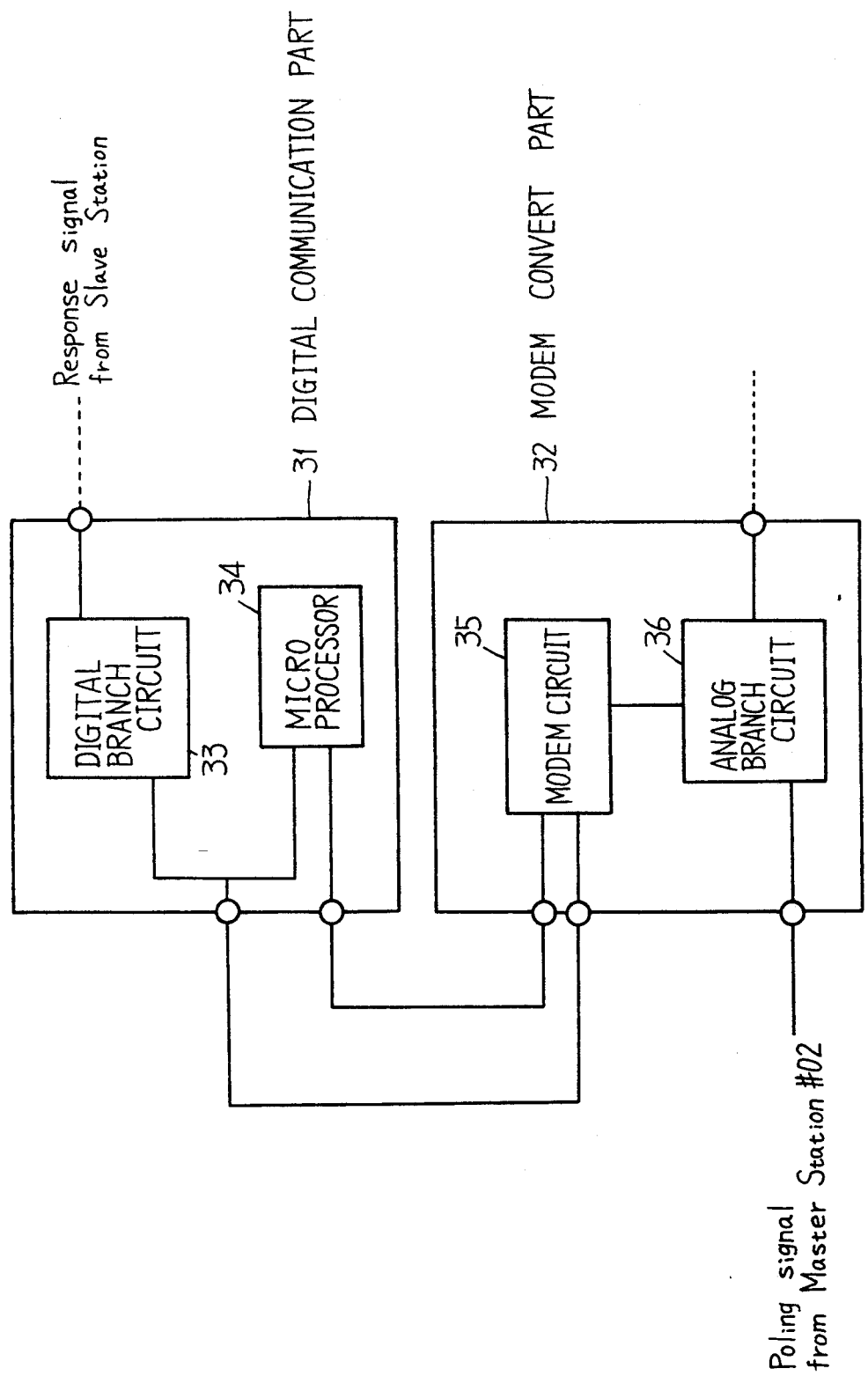

DATA COMMUNICATION SYSTEM

BACKGROUND OF THE INVENTION

1. Field of the Invention

The present invention relates to a polling type data communication system for data communication between a master station and a plurality of slave stations which are connected by a dedicated line used in a multidrop system.

In more detail, the present invention relates to a data communication system which permits coexistence of digital lines and analog lines and utilizes polling type data communication, where a master station and a plurality of slave stations are connected by digital lines or analog modem lines in hierarchical form.

2. Description of the Prior Art

Recently, a variety of analog and digital transmission equipment has been developed for data communication. A system connecting the analog lines and digital lines allowing coexistence of analog and digital equipment was needed, and therefore has been established. An example of such a system is shown in FIG. 1 in which items 111-119 indicate a variety of transmission equipment. A solid line indicates an analog transmission line while dotted line indicates a digital transmission line. For monitoring such a system, the transmission equipment of the highest level of the hierarchy includes a monitoring master station, while the multiplicity of transmission equipment includes monitoring slave stations #01-05. Slave station #01 includes repeating equipment to allow coexistence of the analog and digital lines to which it is connected. The monitoring master station collects data with the auxiliary line voice channel of the transmission line used as the dedicated line. U.S. Pat. No. 4,727,541 illustrates a typical transmission line having auxiliary and main channels. In this case, the master station gathers information in the polling system for the lower level slave stations.

As explained above, gathering information through this system permitting coexistence of digital lines and analog lines effects communication through repeating equipment provided between such analog line and digital line. A conventional embodiment of such repeating equipment as incorporated into slave station #01 is shown in FIG. 2. Reference numeral 11 denotes a modem circuit which demodulates the analog signal to be input through the analog line or modulates the signal reversely transmitted from the stations of lower level; LSI 12 is communication interface circuitry to convert the serial input signal into a parallel signal; microprocessor 13 stores the converted input signal into buffer 14 for adjustment of output timing; LSI 15 is communication interface circuitry to convert the parallel input signal into a serial signal; driver/receiver 16 sends the signal to the lower level stations or receives the signal from the lower level stations.

The process by which a digital signal is input from the lower level slave stations is as follows: When a digital signal is input from the lower level slave stations, driver/receiver 16 receives this signal and is then transferred to microprocessor 13 through LSI 15. Microprocessor 13 accumulates the input signal in buffer 14 until the carrier signal which is to be sent to transmit the analog signal to the line in the side of stations of higher level by the modem circuit 11 is generated and stabilized. An oscillator in modem circuit 11 is always in the oscillating condition, however the oscillation output is not constantly transmitted to the line extending toward the higher level stations. This is because if branched lines simultaneously generate a carrier signal, this conventional system cannot discriminate between various higher level stations due to the method of processing information employed by the polling system. Therefore, the carrier is first transmitted to the line toward the higher level stations after the signal responsive to the polling is received from the lower level stations providing the condition to enable signal output. Since a reasonable time is required until the carrier signal is stabilized, the microprocessor has a buffer to output the signal to the modem line after the carrier is stabilized.

This operation is carried out for every character of data, and therefore generates delay time in the signal transmission. Each polling process requires a longer time resulting in a deterioration of process quality. Since the signal must be transmitted to the modem 11 after the carrier is stabilized repeating equipment as explained above is required causing the additional problem of adding complexity to the circuit structure.

SUMMARY OF THE INVENTION

It is therefore an object of the present invention to provide a data communication system which allows coexistence of analog lines and digital lines but does not require repeating equipment and does not generate any delay in transmission of information.

According to a preferred embodiment, the present invention provides a data communication system for connecting a multidrop system. A master station and a plurality of slave stations are connected in hierarchical form by a dedicated line, which allows coexistence of the analog lines and digital lines for gathering information in the polling system from the slave stations by the master station Specific elements of this embodiment are a modem circuit in the slave station provided between the analog line and the digital line, connected to the analog line for demodulating the signal sent from the master station and modulating the signal to be sent to the master station from the lower level slave stations and that particular station, and control means connected to the modem circuit to extract a slave discrimination number for transmission destination from the polling signal which is received from the master station through the modem circuit, to determine whether the extracted discrimination number is the discrimination number of a lower level slave station or that particular station The control means then outputs a carrier control signal for sending the carrier to the analog line in order to send the analog signal to the line for the modem circuit, responsive to the result of the extracted discrimination number.

The modem circuit starts transmission of a carrier signal to the line in order to send the response signal from the lower level slave stations to the higher level stations when the carrier control signal is received from the control means. The modem circuit starts to transmit a response signal to the higher level stations upon input of the response signal from the lower level slave stations.

BRIEF DESCRIPTION OF THE DRAWINGS

The above and other objects and the attendant advantages of the present invention will become readily apparent by reference to the following detailed descrip

FIG. 5 illustrates the structure of a polling signal;

FIG. 7 is an example of the hardware structure illustrating line accommodation of slave stations shown in FIG. 3.

DESCRIPTION OF THE PREFERRED EMBODIMENT

Figure 1:
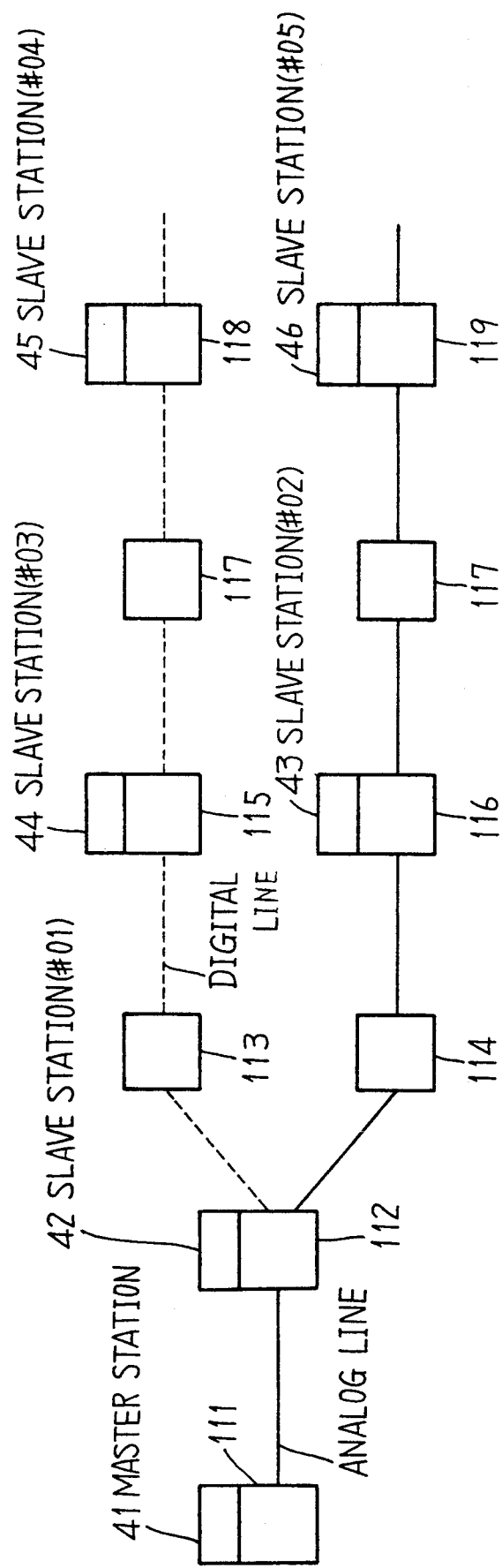
- FIG. 1 illustrates a convention example of a polling type date communication system.
Figure 2:
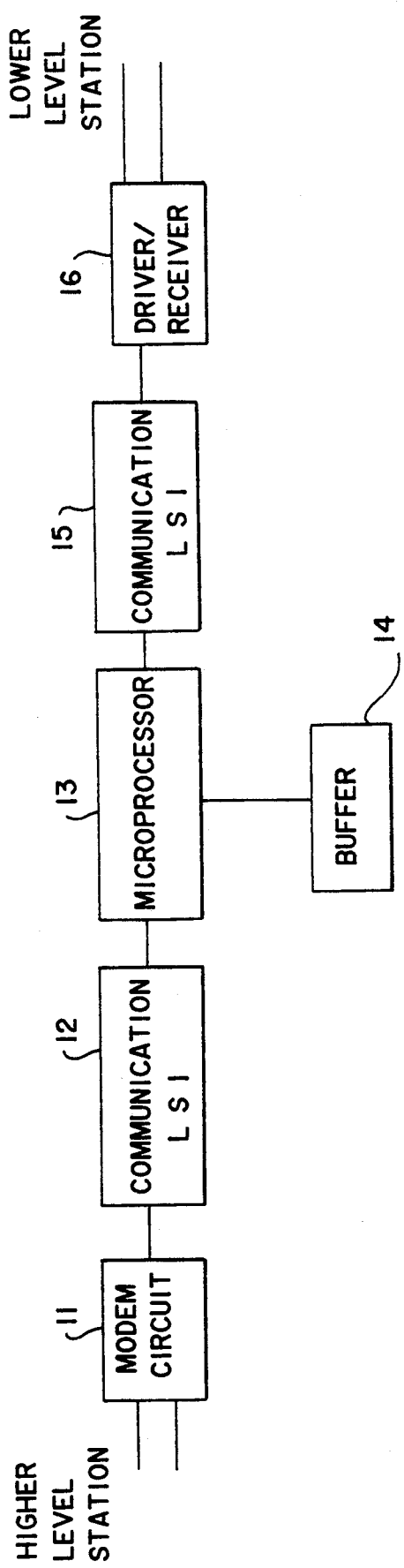
FIG. 2 illustrates conventional repeating equipment provided between an analog line and a digital line.

A preferred embodiment of the present invention will be explained in detail. Reference numerals indicate like elements throughout this specification.

Figure 3:
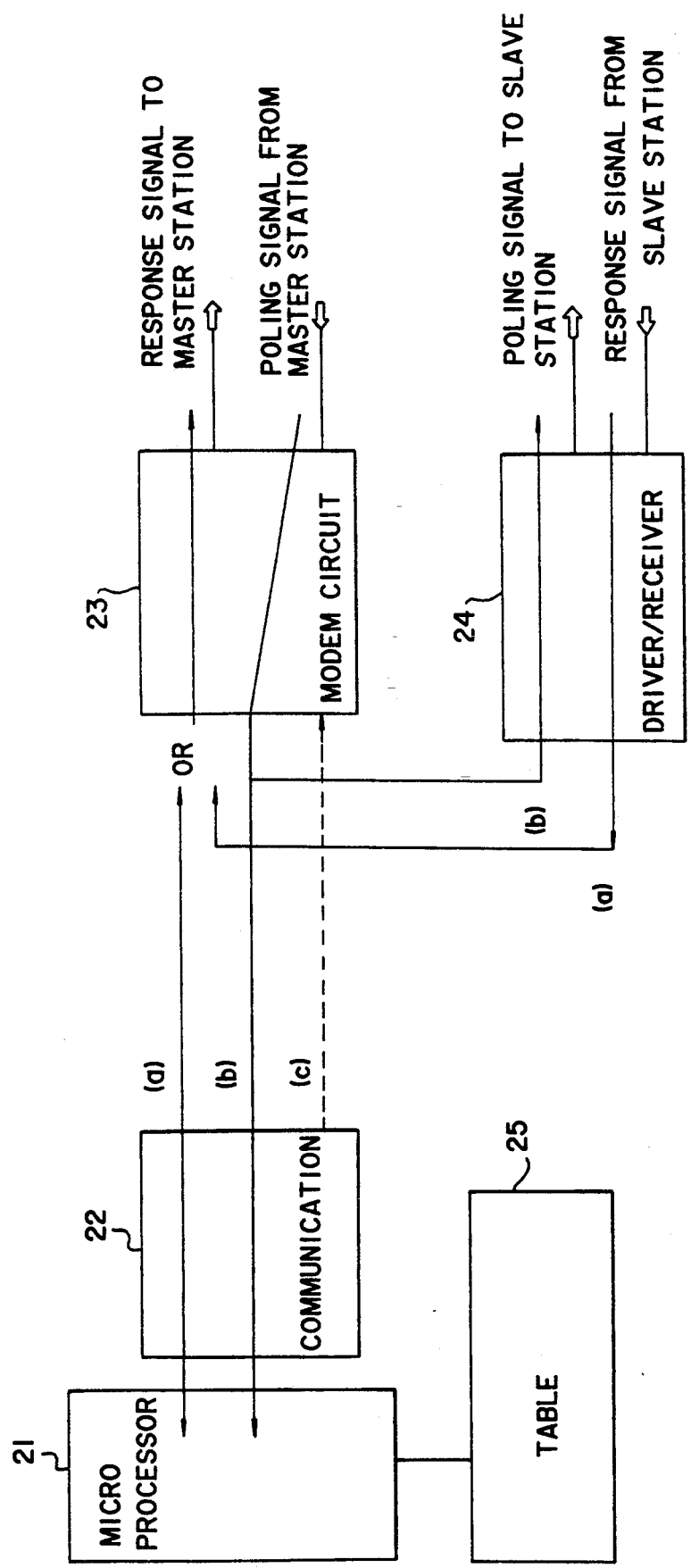
FIG. 3 illustrates an embodiment of a slave station provided between the analog line and the digital line according to the present invention.

The structure of a monitoring slave station to which both analog lines and digital lines in the present invention are connected is shown in FIG. 3. While the prior art teaches that the modem circuit transmits the carrier to the higher level after the answer signal to the polling from the lower level line is input, the present invention teaches that the monitoring slave station provided between the analog line and digital line includes the modem circuit, etc. and is also given tabulated discrimination numbers of the other slave stations connected as lower level stations of the particular slave station. The polling signal from the master station discriminates the polling to the lower level slave station to the particular station and simultaneously starts transmission of a carrier signal to the analog line.

In FIG. 3, reference numeral 21 denotes a microprocessor which has been provided in the slave stations; LSI 22 is provided for communication; also shown is modem circuit 23 which is also included in the repeating equipment as well as the slave stations; driver/receiver 24 which is similarly included in the repeating equipment; and table 25 for storing the discrimination signals of slave stations connected on the lower level side. Table 25 is provided for setting the discrimination numbers of slave stations connected in the lower level side at the time when the system is initially configured with the control from microprocessor. In case the system is modified, the table must also be modified under the control of microprocessor. The data being transmitted from the relevant slave station or lower level slave stations is indicated as (a); the data signal to the slave stations from the master station as (b); and the carrier control signal from controlling the transmission of the carrier to the higher level line for the modem circuit 23 as (c).

Figure 4:
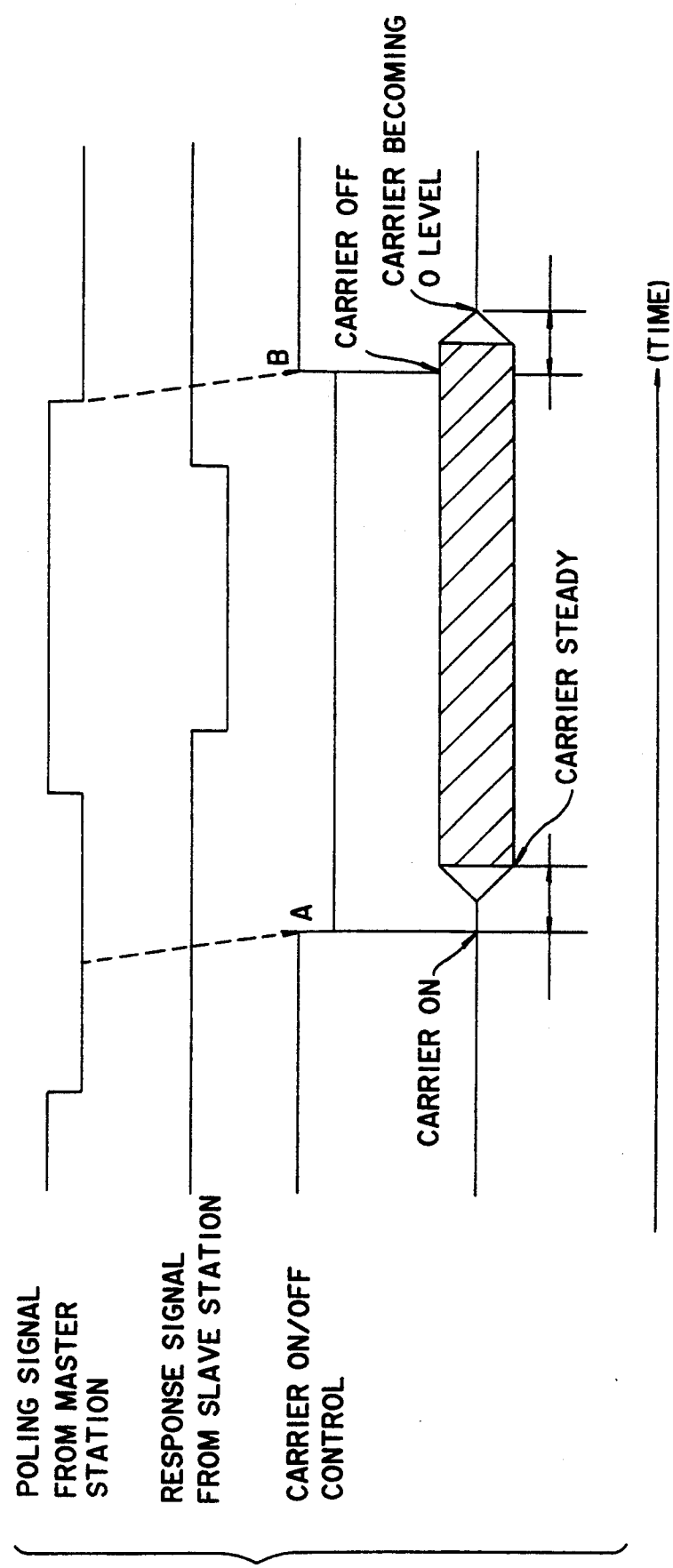
FIG. 4 is a diagram illustrating carrier control.

FIG. 4 is a diagram for explaining the carrier control. The master station transmits a polling signal consisting of a start code+slave station number+command+stop code, as illustrated in FIG. 5. In the case where a response signal from the slave station, the response is used in the place of a command in the signal format. This polling signal is also transmitted to all branched lines. In the slave station which has received the polling signal, modem circuit 23 demodulates the signal and the microprocessor 21 receives the signal through the LSI communication circuitry. Microprocessor 21 discriminates the slave station number included in the polling signal and also discriminates whether such slave station number corresponds to the slave station connected in the lower level by referring to table 25 accumulating the lower level slave station discrimination number. When the polling signal is to be transmitted to that particular station, discrimination is naturally possible. As a result, when it is determined that the polling signal is the signal for the lower level slave station (including that particular slave station), microprocessor 21 outputs the carrier control signal to modem 23. The modem circuit 23 which has received the carrier control signal turns On the carrier. The aforementioned operation is enabled as shown in FIG. 4, even when the command is not received perfectly. The modem circuit 23 which has received the carrier control signal transmits the carrier signal to the higher level line upon reception of the carrier control signal, which occurs when the response signal to polling is transmitted from the lower level line. Accordingly, when the response signal for the polling is transmitted thereafter from the lower level slave stations, it is no longer necessary to send the signal through the buffer since the carrier signal is transmitted to the higher level line and stabilized. Then the signal may be transmitted through direct modulation by the modem. As a result, it is unnecessary to provide repeating equipment which includes a buffer.

Moreover, when the next polling signal is received from the master station, transmission carrier control signal stops. The transmission of the carrier control signal is stopped after discriminating the station number because the next polling signal is sometimes directed to the lower level slave stations of that particular station. More importantly, it is best to stop transmission of the carrier control signal after receiving the next polling signal because considerable time is required until influence on the stations of higher level is eliminated after the transmission of the carrier signal to the analog line is stopped. In addition, since it is also assumed that the next polling signal appears after a considerable delay, the effect may further be improved by combining the method of stopping the transmission of the carrier signal after the predetermined time has passed and the transmission of the response signal. The operations explained above are executed by software previously stored in the microprocessor memory.

Figure 6:
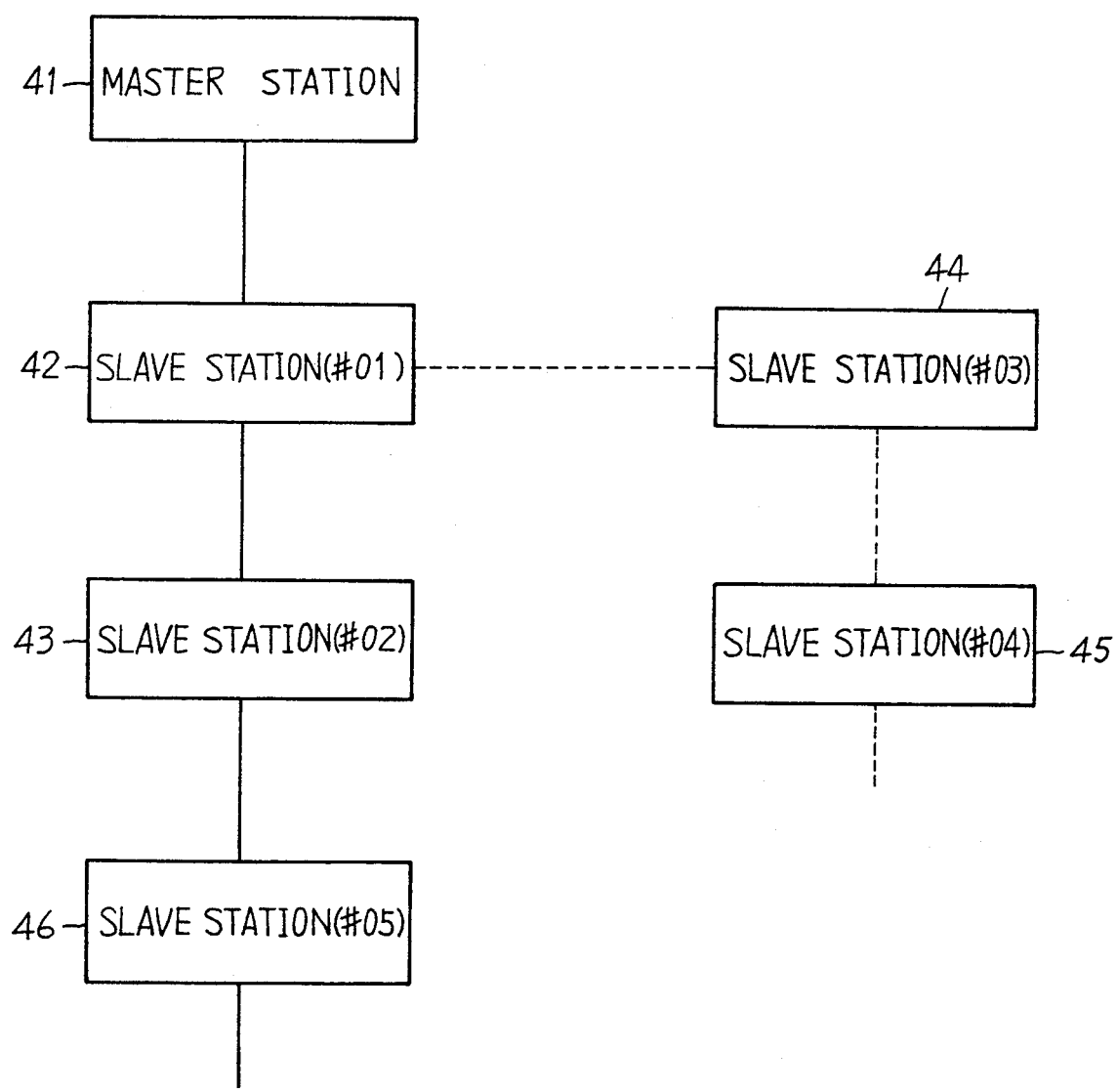
FIG. 6 is a diagram illustrating a simplified master station and slave stations as shown FIG. 1.

FIG. 6 shows a simplified arrangement of the master station and slave stations extracted from FIG. 1 except that slave station (#01)42 includes the present invention. In this figure, the dotted line indicates an analog line, while the solid line indicates a digital line. The reference numeral 41 denotes a master station and 42-46 are slave stations. The present invention is directed to the slave stations such as the station (#01) 42, where a line to lower level stations is an analog line and the line to higher level stations is a digital line. FIG. 3 shows only a structure for transmitting the signal to the digital line through the modem circuit, while FIG. 7 shows a hardware structure of the slave station (#01) in a case where both analog lines and digital lines coexist simultaneously in the lower level. FIG. 7 includes digital communication part 31; modem convert part 32; digital branch part 33; microprocessor 34 (providing the table accumulating discrimination numbers of slave stations in the lower level as explained previously); modem circuit 35 and analog branch circuit 36. As mentioned above, a plurality of lower level slave stations are connected by either the analog line or the digital line. The signal is transmitted via the analog branch circuit 36 to the lower level slave station connected by the analog line. The signal is also transmitted to the lower level slave stations connected by the digital line as explained above.

The present invention is intended to eliminate the need for repeating equipment, and is capable of reducing the time required by the polling process, because transmission to the higher level station is enabled upon reception of the response signal since transmission of carrier is dependent upon discrimination of the slave station number of the polling signal.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A data communication system having a master station and a plurality of slave stations arranged in hierarchical forms thereto and connected with a dedicated line allowing coexistence of analog lines and digital lines in a multidrop system, and the master station gathers information from the slave stations by a polling system, at least one of said slave stations being a first slave station provided between an analog line and a digital line, said first slave station comprising:
   (a) modem means, electrically and operatively connected to said analog line, for demodulating a first signal from the master station and modulating a second signal toward lower level slave stations and modulating a third signal as a response signal toward the master station from said first slave station, and
   (b) control means, electrically and operatively connected to said modem means for extracting a slave station discrimination number from a polling signal which is received from said master station through said modem means, determining whether said extracted discrimination number indicates the discrimination number of a lower level slave station with respect to said first slave station and outputting a carrier control signal for sending a carrier signal in accordance with the result of the extraction of the discrimination number, wherein;
   said modem means transmits said carrier signal to a line upon reception of said carrier control signal from said control means to send the response signal from the lower level slave stations to high level stations and also transmits the response signal to the higher level stations when the response signal is input from the lower level slave stations.

2. A data communication system as claimed in claim 1, wherein said control means comprises:
   slave station setting means for setting and accumulating discrimination numbers of lower level slave stations, and
   discrimination output means for extracting a slave station discrimination number from the polling signal sent from said modem means and determining whether said extracted discrimination number is a discrimination number of a lower level slave station with respect to said first slave station, and outputting the carrier control signal for sending the carrier signal to a line in accordance with the result of determination for said modem circuit.

3. A data communication system as claimed in claim 2, wherein said control means further comprises a first stop signal sending means for sending a carrier stop signal to disable transmission of said carrier signal to the line for said modem means upon reception of a next polling signal after transmission of said carrier control signal.

4. A data communication system as claimed in claim 3, wherein said control means further comprises a second stop signal sending means for sending the carrier stop signal to disable transmission of the carrier signal for said modem means when a next polling signal is not received after a predetermined time elapses after transmission of said carrier control signal.

5. A data communication system as claimed in claim 2, wherein said polling signal comprises a start code, a slave station number, a command and a stop code.

6. A data communication system as claimed in claim, 1, wherein said master station and slave stations are monitoring equipment included within predetermined transmission equipment of a communication system connecting a plurality of transmission equipment connected in hierarchical form by analog lines and digital lines for monitoring a predetermined scope of communication.

* * * * *